United States Patent [19]

Wall

[11] 4,428,396
[45] Jan. 31, 1984

[54] ADJUSTABLE VALVE ASSEMBLY

[75] Inventor: Gerald E. Wall, Culpeper, Va.

[73] Assignee: City Tank Corporation, Culpeper, Va.

[21] Appl. No.: 461,597

[22] Filed: Jan. 27, 1983

Related U.S. Application Data

[63] Continuation of Ser. No. 926,519, Jul. 19, 1978, abandoned.

[51] Int. Cl.³ ............................................ F16K 17/18
[52] U.S. Cl. ................................ 137/493.9; 137/493; 137/513.3; 137/515
[58] Field of Search ................... 137/493, 493.9, 515, 137/540, 543.21, 515.3, 515.5, 515.7, 508

[56] References Cited

U.S. PATENT DOCUMENTS

| | | | |
|---|---|---|---|
| 1,322,638 | 11/1919 | Smolensky | 137/540 |
| 2,645,242 | 7/1953 | Monnich | 137/540 X |
| 3,437,065 | 4/1969 | Robbins | 137/493.9 |
| 4,044,791 | 8/1977 | McKenzie | 137/493.9 |

FOREIGN PATENT DOCUMENTS 901142  7/1962  United Kingdom ................ 137/540

Primary Examiner—Robert G. Nilson
Attorney, Agent, or Firm—Lalos, Leeds, Keegan, Lett & Marsh

[57] ABSTRACT

A valve assembly has an elongated tubular body having a fluid passageway axially therethrough providing first and second end ports with a floating valve seat and an engageable poppet disposed in the fluid passageway of the body between the ports thereof and spring means disposed on the body for yieldably biasing the valve seat into engagement with the poppet and other spring means disposed in the body for yieldably biasing the poppet into engagement with the valve seat; a central abutment is disposed in the body between and engageable by the floating valve seat and poppet for restricting the movement of each of the floating valve seat and poppet toward the other thereof under the influence of both spring means. The floating valve seat has a fluid passageway therethrough intercommunicating the first port and the poppet when the valve seat and poppet are disposed in engagement with the poppet having a primary fluid passageway therethrough intercommunicating the fluid passageway of the floating valve seat and the second port of the body when the valve seat and poppet are disposed in engagement, and the poppet having at least one secondary fluid passageway intercommunicating the floating valve seat and the second port of the body. Manually adjustable threaded tubular coupling members are mounted for axial adjustment in the ports to vary the force exerted by the springs to effect desired valve operation at desired pressure and operating conditions.

22 Claims, 3 Drawing Figures

ADJUSTABLE VALVE ASSEMBLY

This application is a continuation of application Ser. No. 926,519, filed July 19, 1978, now abandoned.

BACKGROUND OF THE INVENTION

The subject invention relates to an adjustable valve assembly and more particularly to an adjustable valve assembly adapted to accommodate fluid flow in forward and reverse directions at different flow rates responsive to a critical line pressure with the valve being adjustable to vary the critical line pressure at which the flow rate is varied.

In control systems for fluid actuated mechanisms such as hydraulically actuated packer mechanisms for refuse collection vehicles and the like, it often is desirable to provide valves which are adapted to accommodate the flow of fluid in forward and reverse directions at different flow rates responsive to line pressure to provide a predetermined cycling of the mechanism. It has been found, however, that most valves of such type in the prior art are not entirely effective and reliable in the performance of such functions.

As a result of the shortcomings of the prior known valves, the valve assembly of U.S. Pat. No. 4,044,791 owned by the same assignee as the present application was invented and provided a substantial advantage over the earlier control valve devices. However, the valve of the aforementioned patent, while providing exceptionally satisfactory performance under relatively unchanging conditions, is not capable of providing fully satisfactory performance in instances in which the viscosity of the oil employed in the valve varies such as in cold weather or when the valve is used for different purposes under substantially different pressure ranges. On such occasions, it has been found necessary to either completely replace the valve or to disassemble the valve to replace the internal spring components in order to accommodate the changed conditions. The present invention represents an improvement over the invention of the aforementioned patent in that it provides accommodation for a wide variety of pressure and oil viscosity conditions by effecting a simple adjustment of the valve which permits the valve to operate satisfactorily under a new set of pressure and/or viscosity conditions.

Accordingly, it is the principal object of the present invention to provide an improved adjustable valve assembly.

Another object of the present invention is to provide an improved adjustable valve assembly which can be adjusted to accommodate the flow of fluid in forward and reverse directions at different flow rates responsive to a wide range of critical line pressures.

A further object of the present invention is to provide a novel and versatile adjustable valve assembly suitable for use in a control system for a fluid actuated mechanism.

A still further object of the present invention is to provide a novel adjustable valve assembly adapted to accommodate the flow of fluid in forward and reverse directions at different flow rates responsive to line pressure which is suitable for use in the control system for a fluid actuated packer mechanism of a refuse collection vehicle.

Another object of the present invention is to provide a novel adjustable valve assembly which is highly responsive to line pressures for effecting changes in flow rates therethrough in both forward and reverse directions.

A further object of the present invention is to provide a novel adjustable valve assembly which is comparatively simple in design, relatively inexpensive to manufacture and highly effective and reliable in performance under a wide degree of operating parameters.

SUMMARY OF THE INVENTION

Achievement of the foregoing objects of the invention is enabled by the preferred embodiment in which an elongated tubular valve body has a centrally located annular inwardly extending flange, the inner extent of which defines an axial opening with a floating valve seat being positioned on one side of the flange for axial movement in the valve body and a poppet being provided on the other side of the annular flange for axial movement in the valve body. First and second biasing spring members respectively urge the floating valve seat and the poppet toward the annular flange with the poppet extending axially through the opening defined by the inner extent of the annular flange to engage the floating valve seat. Both the poppet and the floating valve seat include axial flow passageways through which flow normally occurs first through the floating valve seat then through the poppet. However, upon the buildup of pressure in the floating valve seat, the poppet is moved to the right away from contact with the floating valve seat to permit additional passageways provided in the poppet to receive and direct fluid from the floating valve seat to relieve the pressure and increase the fluid flow through the valve. The present invention provides first and second axially adjustable threaded tubular coupling members engaging spring retainer members mounted in the opposite ends of the valve body to respectively engage and adjust a respective one of the spring members. The adjustable spring retainer member on the end of the valve body in which the floating valve seat is provided engages the end of the biasing spring which is engaged with the floating valve seat so that adjustment of the spring retainer member axially within the valve body serves to adjust the force with which the spring urges the floating valve seat toward the annular flange in the center of the valve body. The spring retainer mounted in the other end of the valve body adjusts the force with which the floating valve body is urged toward the annular flange and the poppet. By adjustment of the coupling member associated with the spring retainer member engaging the poppet springs, the critical pressure at which the poppet shifts to permit increased flow is easily adjusted to accommodate varying operational conditions.

Other objects and advantages of the present invention will become more pertinent to those persons having ordinary skill in the art to which the present invention pertains, from the following description taken in conjunction with the accompanying drawings.

Figure 1:
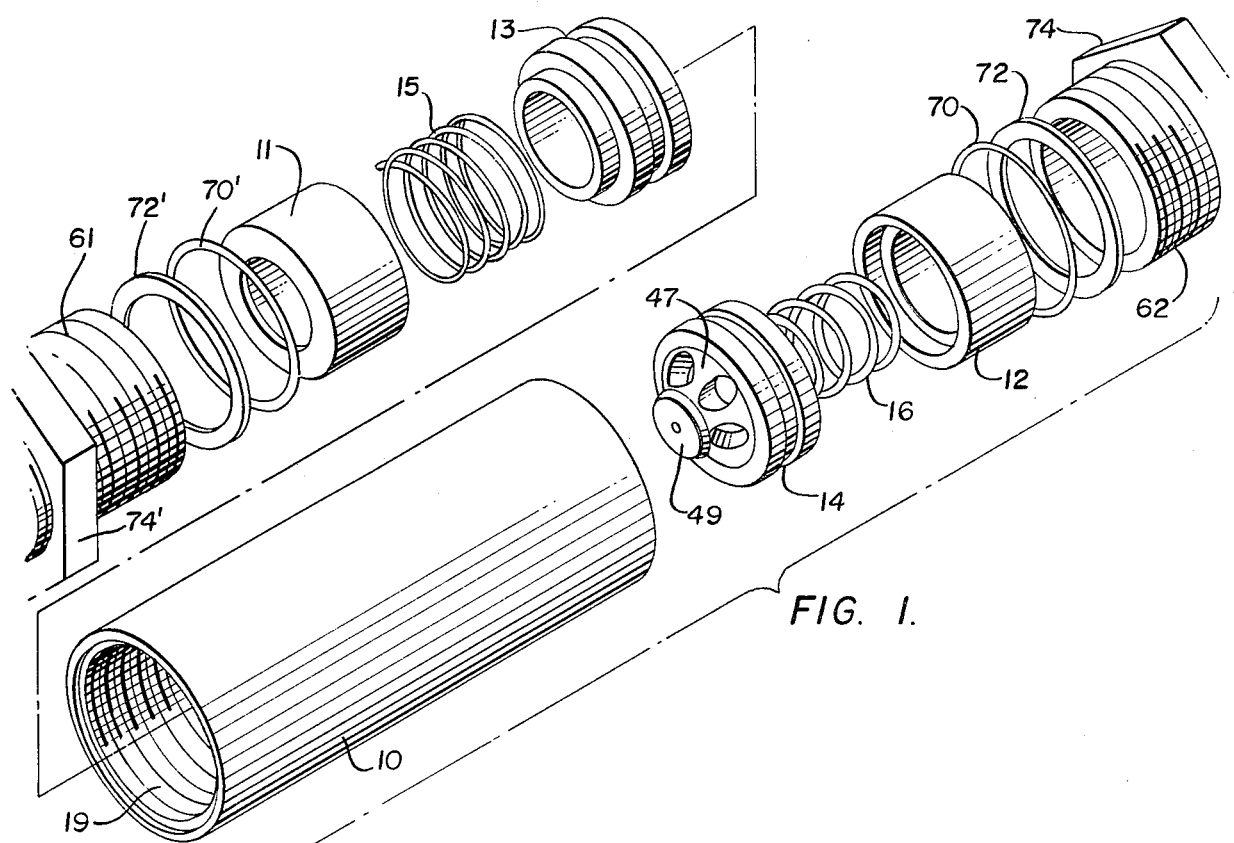
FIG. 1 is a perspective view of the preferred embodiment of the invention, illustrating the components thereof in exploded relation.

Referring to the drawing, it will be seen that the embodiment illustrated therein generally includes an elongated tubular housing or body 10 with a pair of spring retainers 11 and 12 disposed within housing 10 and first valve element or floating valve seat 13 and a second valve element or poppet 14 positioned between the retainers 11 and 12. A first compression spring 15 is interposed between the retainer 11 and the floating valve seat 13 and a second compression spring 16 is interposed between the retainer 12 and the poppet 14.

Figure 2:
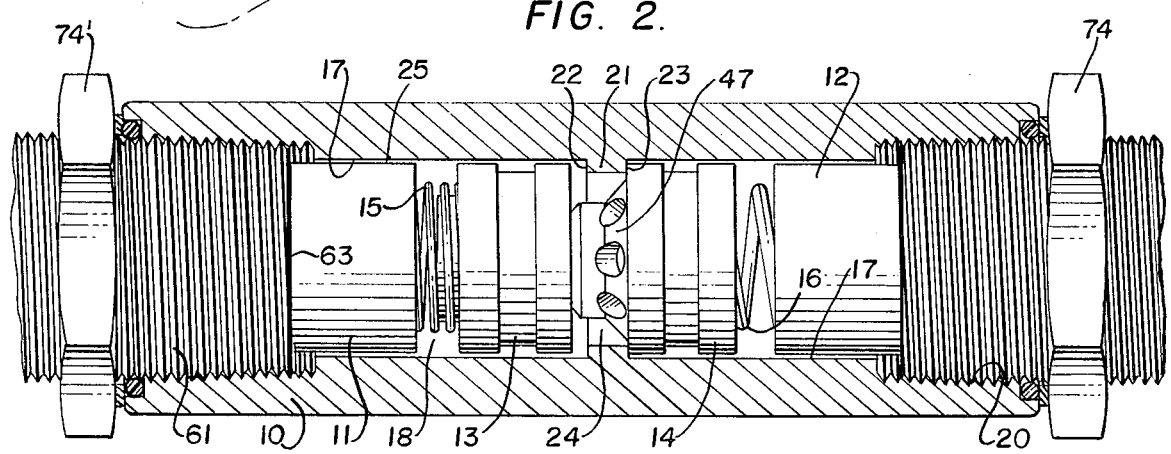
FIG. 2 is a side elevational view of the embodiment shown in FIG. 1, illustrating the components thereof in the assembled condition and the housing or body portion thereof in vertical cross-section.
Figure 3:
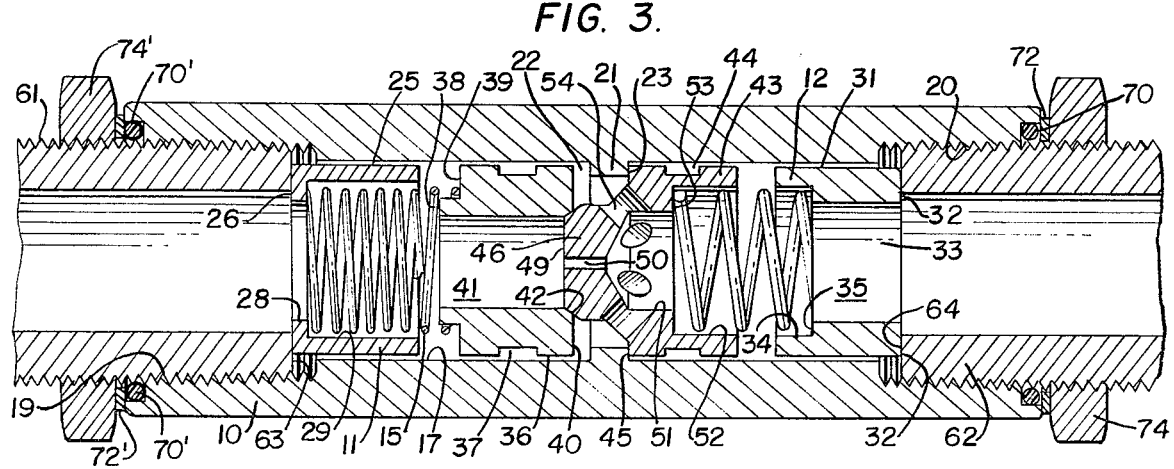
FIG. 3 is a vertical cross-sectional view of the embodiment illustrated in FIGS. 1 and 2.

Housing or body 10 has a substantially tubular configuration providing an inner cylindrical wall 17 defining a fluid passageway 18 intercommunicating a pair of ports 19 and 20 respectively provided at opposite ends of the housing. The end portions of inner cylindrical wall 17 adjacent ports 19 and 20 are threaded as illustrated in FIGS. 2 and 3 to permit threaded tubular connectors 61 and 62 to be threadably mounted in the valve assembly. Inner cylindrical wall 17 is also provided with an annular flange 21 disposed centrally between the ports 19 and 20 thereof which provides a pair of annular abutment surfaces 22 and 23 and the inner extent of which defines a restricted section 24 in the passageway 18.

Retainer 11 has an annular configuration including an outer cylindrical surface 25 slidably engaging inner housing wall 17, an annular end surface 26 engaging end surface 63 of tubular connector 61 and an axial passageway 28 having an enlarged section 29 providing an annular surface 30 which is engaged by the outer end of compression spring 15 which has its opposite end engaged with the floating valve seat 13. Similarly, retainer 12 has an annular configuration including an annular surface 31 disposed substantially in engagement with inner housing wall 17, an annular end surface 32 engaging end surface 64 of tubular connector 62 and an axially disposed passageway 33 having an enlarged section 34 defining an annular seating surface 35 engaged by one end of compression spring 16 which has its opposite end engaged with the poppet 14.

Floating valve seat 13 is provided with a cylindrical surface 36 which is recessed at 37 and which is disposed in sliding sealing engagement with inner housing wall 17. Preferably, an o-ring is provided between the floating valve seat and inner housing wall 17 in recess 37 to provide a fluid tight seal therebetween. The floating valve seat 13 is also provided with an end surface 38, recessed at the outer periphery thereof to provide an annular seating surface 39 engaged by the inner end of compression spring 15. The opposite end of the floating valve seat comprises an end surface 40 biased into engagement with annular abutment surface 22 by compression spring 15 with an axially disposed main passageway 41 being provided with an end in the form of a frusto-conically configured seating surface 42. It will be noted that compression spring 15 is seated on retainer 11 as shown in FIG. 3 and exerts a force on floating valve seat 13 to urge the valve seat into engagement with the annular abutment surface 22 of the housing 10 with a force determined by the axial positioning of retainer 11 in the valve body 10 which is in turn dependent upon the axial position of the tubular connector 61 in body 10.

Poppet 14 also is provided with a cylindrical surface 43 which is disposed in sealing engagement with inner cylindrical wall 17 and which has an annular recess 44. Here, also, it is preferred that a fluid tight seal between the poppet and the inner wall of the housing be provided with an o-ring in recess 44. Poppet 14 is also provided with an annular end surface 45 and a protruding portion 46 which projects through restricted passageway section 24 of the housing 10 when annular end surface 45 engages annular abutment surface 23 of abutment flange 21. Protruding portion 46 includes an inner, frusto-conically shaped surface 47, as best illustrated in FIGS. 1 and 2, a frusto-conically configured seating surface 48 adapted to engage similarly configured surface 42 of the floating valve seat, and an end surface 49 which is adapted to be disposed within fluid passageway 41 of the floating valve seat when valve seating surface 48 of the poppet engages seating surface 42 of the floating valve seat.

Poppet 14 is additionally provided with an axially disposed, primary passageway 50 having a first enlarged section 51 and a second enlarged section 52 defining an annular surface 53 engaged by the inner end of compression spring 16. As best illustrated in FIGS. 3, poppet 14 also is provided with a plurality of circumferentially spaced secondary passageways or ports 54 provided between frustoconically shaped surface 47 of the poppet and section 51 of the axial passageway therein. Consequently, fluid pressure in port 20 is communicated to the volumetric space between facing surfaces 40 and 45 so as to act on surface 40 against the force of spring 15 to urge the floating valve element 13 toward the left as viewed in FIGS. 2 and 3 of the drawings.

From the construction of the assembly as described, it will be noted that compression springs 15 and 16 will urge the floating valve seat and poppet into mutual engagement and that the travel of either of the floating valve seat or poppet in the direction of the other thereof will be restricted by annular flange 21. The force with which the spring 16 urges the poppet 14 toward the floating valve seat 13 depends upon the position of retainer 12 which is in turn dependent upon the axial position of the tubular connector 62. It should be noted that the tubular connector 62 can obviously be moved axially within the housing 10 by rotation therein. Additionally, an o-ring 70 is provided in the bevelled outer end of the passageway in the housing and is engaged by a washer 72 and held in clamped position by an adjustable nut 74 threaded on the outer threaded surface of the tubular connector 62. Thusly, the axial positioning of the tubular connector member 62, and the resultant compressive force of spring 16, can be adjusted by loosening of nut 74, rotating the tubular connector 62 to the desired position with the nut 74 then being tightened to seal the assembly. A similar adjustment of the connector 61 and retainer 11 can be effected by axial positioning of the tubular connector 61 which is similarly associated in the housing 10 with an o-ring 70', a washer 72' and adjustable nut 74'. Consequently, the force exerted by spring 15 on the floating valve seat 13 can be adjusted in essentially the same manner as the force exerted by spring 16 on the poppet 14. However, it should be understood that the main adjustment normally necessary in operation of the valve is the adjustment of spring 16 to vary the force with which the poppet 14 is urged to the left as shown in FIGS. 2 and 3 toward the annular flange 21 and the floating valve seat 13.

In the operation of the assembly, whenever fluid below a predetermined pressure is flowing through the assembly in a forward direction, i.e., from port 19 to port 20, the fluid will flow through port 19, retainer 11, passageway 41 of the floating valve seat, passageway 50 of the poppet, retainer 12 and out through port 20. Under such conditions, because of the restricted size of primary passageway 50 in poppet 14, the fluid will flow at a comparatively low rate. However, whenever the line pressure increases beyond a predetermined critical value, the fluid pressure against end surface 49 of the poppet will overcome the force exerted on the poppet by compression spring 16 to cause the poppet to move to the right toward port 20. Initially, as poppet 14 moves to the right, it will remain seated on the floating valve seat due to the pressure exerted on the floating valve seat by compression spring 15. However, as the poppet continues to move to the right, end surface 40 of the floating valve seat will engage abutment surface 22 thus preventing the floating valve seat from continuing to move to the right. Under such circumstances, the force of the fluid, continuing to act on end surface 49 of the poppet, will unseat the poppet from the floating valve seat thus causing a displacement between the floating valve seat and the poppet permitting fluid to flow past the protruding portion of the poppet and through secondary passageways 54 thus increasing the flow rate of the fluid as the line pressure remains at or above the aforementioned critical value.

With the components of the assembly disposed in positions as illustrated in FIGS. 2 and 3 and with fluid flowing through the assembly from right to left in a reverse direction, under a pressure below a reverse flow predetermined critical value, the fluid will flow through retainer 12, axial passageway 50 of poppet 14, passageway 41 of the floating valve seat, retainer 11 and out through port 19, at a first flow rate. Under such conditions, fluid will flow through secondary passageways 54 and its pressure will act on end surface 40 of the floating valve seat but the floating valve seat will continue to engage the protruding portion of the poppet 13 due to the force exerted by compression sring 15. However, whenever the line pressure increases above the reverse flow predetermined critical value, sufficient force is brought to bear against end surface 40 of the floating valve seat to displace the floating valve seat relative to the poppet thus permitting fluid to flow at a higher flow rate through both primary passageway 50 and secondary passageways 54 past the gap provided by the displacement of the floating valve seat and poppet into passageway 41 of the floating vlave seat. It thus will be seen that the valve assembly will be operated to accommodate the flow of fluid through forward and reverse directions at different flow rates responsive to predetermined line pressures.

The critical pressure at which the valve shifts from the low flow condition to the high flow condition when operating in a reverse right to left manner depends upon the pressure exerted by spring 15 on the floating valve seat 13 and can be adjusted by adjustment of the tubular connector 61 as previously discussed. Similarly, the critical pressure at which the poppet 14 shifts to the right to permit a higher flow rate through the valve is similarly adjustable by simple adjustment of the tubular connector 62 as previously discussed. The adjustment capability of the preferred embodiment permits the necessary adjustment upon a change in the viscosity of the oil or fluid being passed through the valve without any need for valve disassembly or replacement as was previously the case.

In the embodiment described, cpmpression spring 16 is depicted as larger than compression spring 15 thus functioning to exert a greater force on floating valve seat 13 and poppet 14 than compression spring 15. It is within the scope of this invention, however, that either of such springs have a higher force exerting property than the other or that the force exerting properties of the two springs be equal.

From the foregoing detailed description, it will be evident that there are a number of changes, adaptations and modifications of the present invention which come within the province of those persons skilled in the art to which such invention pertains. For example, the tubular connectors 61, 62 could be unitarily formed with their associated spring retainers 11 and 12. Therefore, it is intended that all such variations not departing from the spirit of the invention be considered as within the scope thereof as limited solely by the appended claims.

I claim:

1. A valve assembly for providing fluid flow at varying rate in accordance with the input pressure of fluid to the valve assembly comprising:
   a body having a fluid passageway therethrough including first and second ports,
   engageable first and second valve elements movably disposed in said fluid passageway between said ports,
   a first biasing means disposed in said body for yieldably biasing said first valve element into engagement with said second valve element,
   a second biasing means disposed on said body for yieldably biasing said second valve element into engagement with said first valve element,
   an abutment means disposed on said body engageable by said first and second valve elements for restricting the movement of each said valve elements toward the other under the influence of said biasing means,
   said first valve element having a main fluid passageway therethrough intercommunicating said first port and said second valve element when said valve elements are disposed in engagement,
   said second valve element having a primary fluid passageway therethrough intercommunicating said main fluid passageway of said first valve element and said second port when said valve elements are disposed in engagement,
   said second valve element having at least one secondary fluid passageway intercommunicating said first valve element and said second port whereby fluid flow at relatively high rates of flow occurs through said primary fluid passageway and said secondary fluid passageway and said main fluid passageway when the input pressure is above a predetermined value with flow being restricted at a lower rate to the primary fluid passageway and the main fluid passageway when the input pressure is below a predetermined value,
   an externally operable adjustment means for selectively varying the force with which said first and second biasing means, respectively, urge said first and second valve elements into engagement,
   said adjustment means including a threaded connector mounted for axial reciprocation in said body, one of said biasing means having an end engageable with one of said valve elements whereby movement of said threaded connector effects variation of the force exerted by said one of said biasing means on said one of said valve elements,
   a first retaining means disposed within said body for retaining said one of said biasing means, and
   said threaded connector being drivingly engageable with said first retaining means.

2. The valve assembly according to claim 1 including, said first retaining means being disposed entirely within said body between said first and second ports.

3. The valve assembly according to claim 1 including, said first and second biasing means comprising first and second compression springs.

4. The valve assembly according to claim 3 including, said first retaining means being disposed entirely within said body between said first and second ports.

5. The valve assembly according to claim 1 including, said first retaining means having a first retaining means outer diameter, said threaded connector having a threaded connector outer diameter, said threaded connector outer diameter being larger, than said first retaining means outer diameter.

6. The valve assembly according to claim 1 including, said first retaining means having an opening through which fluid may pass when flowing between said first and second ports.

7. The valve assembly according to claim 1 including, said first retaining means having a first retaining means inner diameter, said threaded connector having a threaded connector inner diameter, said first retaining means inner diameter being smaller than said threaded connector inner diameter.

8. The valve assembly according to claim 1 including, said threaded connector having a threaded connector inner end which is drivingly engageable with the outer end of said first biasing means.

9. The valve assembly according to claim 1 including, said body having a cylindrical passageway in which said first retaining means can slide and a threaded passageway in which said threaded connector member is threaded.

10. The valve assembly according to claim 9 including, said cylindrical passageway having a cylindrical passageway inner diameter and said threaded passageway having a threaded passageway inner diameter, said cylindrical passageway inner diameter being smaller than said threaded passageway inner diameter.

11. The valve assembly according to claim 1 including, said threaded connector having a passageway through which fluid can pass into said body.

12. The valve assembly according to claim 1 including, said adjustment means including a securing means positioned outside one said port for securing said threaded connector in place relative to said body.

13. The valve assembly according to claim 12 including, said adjustment means further including a sealing means positioned between said securing means and said body.

14. The value assembly according to claim 1 including, a first sealing means positioned adjacent said first port between said body and said externally operable adjustment means, and a second sealing means positioned adjacent said second port between said body and said externally operable adjustment means.

15. The value assembly according to claim 1 including, said externally operable adjustment means being adapted to allow fluid flow therethrough in either direction whereby fluid passes therethrough when traveling from said first port to said second port and when traveling from said second port to said first port.

16. A valve assembly for providing fluid flow at varying rate in accordance with the input pressure of fluid to the valve assembly comprising:

a body having a fluid passageway therethrough including first and second ports, engageable first and second valve elements movably disposed in said fluid passageway between said ports, a first biasing means disposed in said body for yieldably biasing said first valve element into engagement with said second valve element, a second biasing means disposed in said body for yieldably biasing said second valve element into engagement with said first valve element, an abutment means disposed in said body engageable by said first and second valve elements for restricting the movement of each of said valve elements toward the other under the influence of said biasing means, said first valve having a main fluid passageway therethrough intercommunicating said first port and said second valve element when said valve elements are disposed in engagement, said second valve element having a primary fluid passageway therethrough intercommunicating said main fluid passageway of said first valve element and said second port when said valve elements are disposed in engagement, said second valve element having at least one secondary fluid passageway intercommunicating said first valve element and said second port whereby fluid flow at relatively high rates of flow occurs through said primary fluid passageway and said secondary fluid passageway and said main fluid passageway when the input pressure is above a predetermined value with flow being restricted at a lower rate to the primary fluid passageway and the main fluid passageway when the input pressure is below a predetermined value and an externally operable adjustment means for selectively varying the force with which said first and second biasing means, respectively, urge said first and second valve elements into engagement, said externally operable adjustment means comprising a first externally operable adjustment means for selectively varying the position of the outer end of said first biasing means along the longitudinal axis of said body and a second externally operable adjustment means for selectively varying the position of the outer end of said second biasing means along the longitudinal axis of said body, said first biasing means having opposing ends both positioned between said first and second ports, said second biasing means having opposing ends both positioned between said first and second ports said first externally operable adjustment means having an outer end disposed outside said first and second ports and an inner end disposed between said first and second ports and said second externally operable adjustment means having an outer end disposed outside said first and second ports and an inner end disposed between said first and second ports.

17. The valve assembly according to claim 16, including, said first externally operable adjustment means being adjustable independent of said second externally operable adjustment means.

18. The valve assembly according to claim 16 including, said first externally operable adjustment means being positioned adjacent said first port, and said second externally operable adjustment means being positioned adjacent said second port.

19. The valve according to claim 16 including, said first externally operable adjustment means including a first securing means positioned outside said first port for securing said first externally operable adjustment means in place relative to said body.

20. The valve assembly according to claim 19 including, said first externally operable adjustment means further including a first sealing means positioned between said first securing means and said body.

21. The value assembly according to claim 19 including, said first securing means being separate from said body.

22. The value assembly according to claim 16 including, said externally operable adjustment means being adapted to allow fluid flow therethrough in either direction whereby fluid passes therethrough when traveling from said first port to said second port and when traveling from said second port to said first port.

* * * * *